W. G. CLARK.
SLEIGH ATTACHMENT FOR VEHICLES.
APPLICATION FILED APR. 20, 1915.

1,232,222.

Patented July 3, 1917.
2 SHEETS—SHEET 1.

Inventor,
William G. Clark,
By Victor J. Evans,
Attorney

Witnesses:

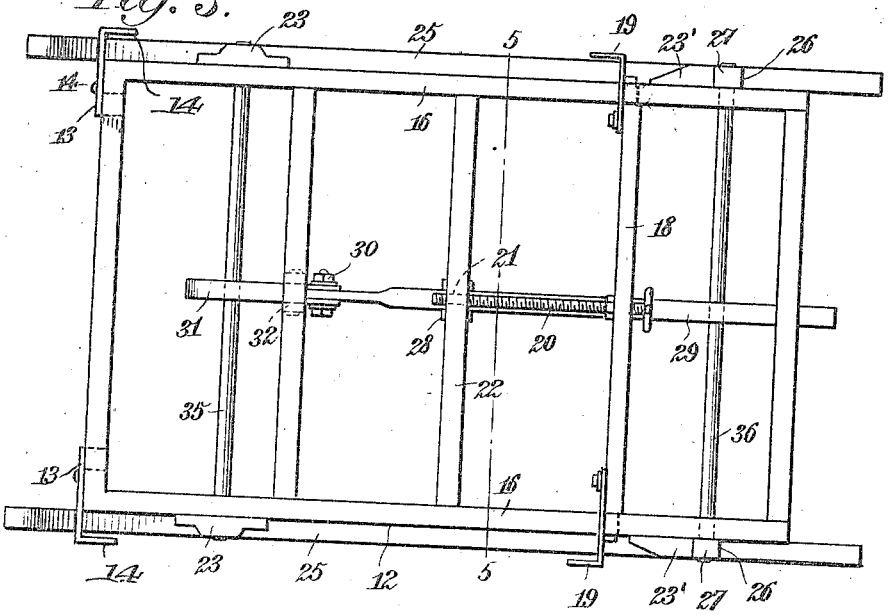
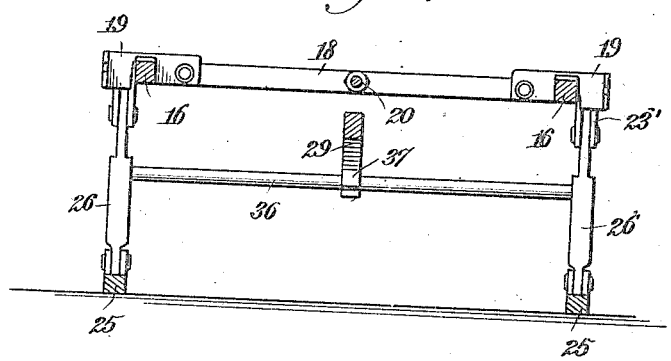
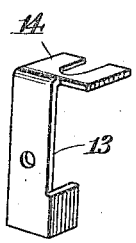

UNITED STATES PATENT OFFICE.

WILLIAM GIBSON CLARK, OF SUNSET, IDAHO.

SLEIGH ATTACHMENT FOR VEHICLES.

1,232,222.        Specification of Letters Patent.        Patented July 3, 1917.

Application filed April 20, 1915.   Serial No. 22,673.

*To all whom it may concern:*

Be it known that I, WILLIAM G. CLARK, a citizen of the United States, residing at Sunset, in the county of Shoshone and State of Idaho, have invented new and useful Improvements in Sleigh Attachments for Vehicles, of which the following is a specification.

An object of the invention is to provide an attachment for a vehicle whereby the same can be readily and quickly converted into a sleigh.

The invention contemplates, among other features, the provision of a suitable sleigh running gear attached to the under side of the vehicle and which is operable to raise or lower the runners to the ground so that the vehicle can be operated over the ground with the usual wheels thereof or when the sleigh attachment is to be used can be operated over the ground upon the usual sleigh runners, the wheels in the latter instance being held in spaced relation to the ground.

Still further embodiments of the invention reside in a structure having suitable means whereby the attachment to the vehicle can be readily made.

In the further disclosure of the invention reference is to be had to the accompanying drawings, constituting a part of this specification, in which similar characters of reference denote corresponding parts in all the views, and in which:

Fig. 3 is a plan view of the sleigh attachment removed from the body of the vehicle;

Fig. 5 is a vertical transverse sectional view taken on line 5—5 of Fig. 3; and

Fig. 6 is a perspective view of one of the attaching members.

Figure 1:
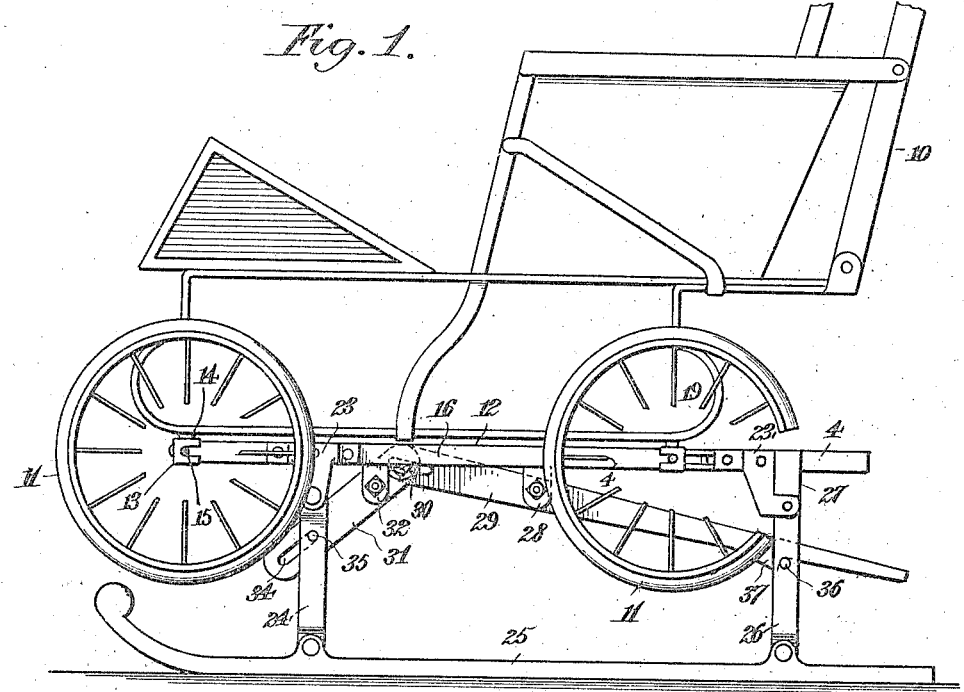
Figure 1 is a side elevation of a vehicle showing the sleigh attachment thereon and in operative position.
Figure 2:
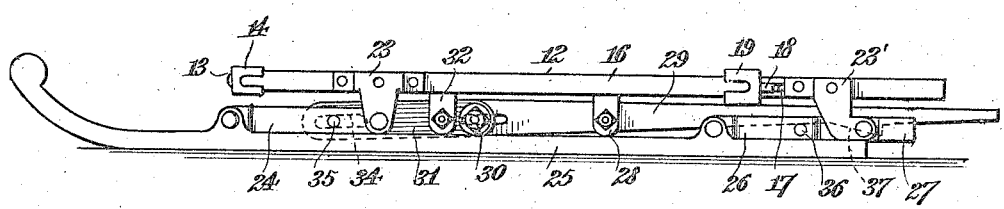
Fig. 2 is a side view illustrating the runners in collapsed position.
Figure 4:
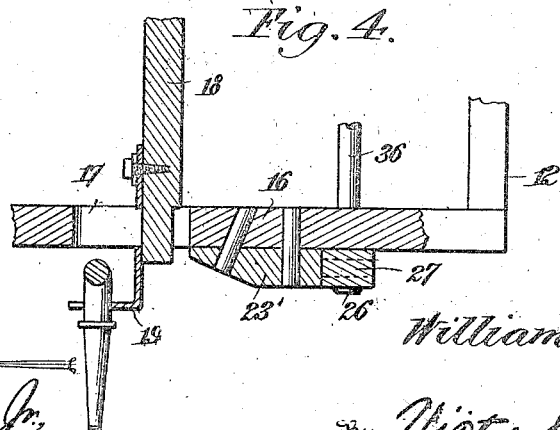
Fig. 4 is a horizontal sectional view taken on the line 4—4 in Fig. 1.

Referring more particularly to the views, I disclose a vehicle body 10 having the usual wheels 11. A rectangular horizontal frame 12 is adapted for attachment to the under side of the vehicle body 10, and to this end at its front is provided with pivoted attaching members 13 having lateral slotted clamping portions 14, the clamping portions 14 of the attaching members adapt said members for engagement over the axle 15 of the vehicle body, as better shown in Fig. 5, whereas when a vehicle body is used having a different type of axle, the latter being better shown in Fig. 6 of the drawing, the attaching member 13 is swung upon the cross bar of the axle. The sides 16 of the frame are provided with slots 17 and a cross bar 18 has its ends arranged to slide in said slots, said cross bar carrying attaching members 19 similar to the attaching members 13 and which attaching members 19 are adapted for similar connection with the vehicle body 10 as the attaching members 13, except that the attaching members 19 will clamp on to the vehicle body at its rear. In order to securely hold the frame 12 upon the vehicle body a screw 20 passes loosely through an opening 21 in the medial portion of the cross bar 18 and is secured in a cross brace 22 of the frame. Now it will be seen that when the vehicle body has been disposed upon the frame and the attaching members 13 connected with the front of the vehicle body, the operation of the screw 20 will advance the cross bar 18 to bring the attaching members 19 in proper position for engagement with the rear of the vehicle body and thus the vehicle body can be securely fastened upon the frame.

Supporting members 23 and 23' are secured at the front and rear sides of the frame respectively, and mounted to swing on the front supporting members are depending arms 24 in pivotal connection with the front ends of runners 25, similar arms 26 being pivoted on the rear supporting members 23' and in pivotal connection with the rear ends of the runners 25, the upper ends of the rear arms 26, however, terminating in blocks 27 which are adapted to abut against the rear faces of the rear supporting members 23' to limit the movement of the runners 25 into lowered or operative position so that when the runners are in contact with the ground the arms 24 and 26 will be disposed vertically. Mounted to swing upon a depending bearing 28 on the cross brace 22 is a lever 29, the front end of which projects beyond the cross brace and by means of a pin and slot connection 30 is connected with a lever 31 mounted to swing on a bearing 32 projecting from the under side of a cross brace 33, the forward end of said lever being provided with a slot 34 through which passes a horizontal strut 35 having its ends secured to the front arms 24, a rear strut 36 being provided, with its ends connected to the rear arms 26, with a catch 37 secured to the lever 29 and adapted to engage the rear strut 36 to hold and lock the runners in operative position.

Now assuming that the wheels 11 of the vehicle body are in contact with the ground, when it is desired to lower the runners into contact with the ground a downward pressure is exerted upon the rear end of the lever 29, thus causing the lever 31 to operate and through the medium of the strut 35 passing through the slot 34 swing the runners downwardly. When the runners are in their lowermost position with the blocks 27 of the rear arms bearing against the bearing supporting the arms, the catch 37 will be in proximity to the rear strut 36 and can be engaged therewith, the rear end of the lever being also engaged with the strut so that the lever will be locked and act as a diagonal brace to hold and secure the runners in operative position, thus preventing the runners from swinging forwardly and out of operative position.

In a similar manner, when an upward pressure is exerted upon the rear end of the lever and the catch has been unlocked from the rear strut, the runners can be swung back into inoperative position and in spaced relation to the ground, with the lower edges of the runners above the periphery of the wheels 11.

Thus from the foregoing description it will be seen that with an attachment of the character described a vehicle can be readily converted from a wheeled vehicle into a sleigh, and it will be clearly seen that the construction described is a simple one, consisting of few parts, and permits of ready operation in order that the conversion of the vehicle from a wheeled vehicle to a sleigh can be readily accomplished.

Having thus described my invention, I claim:

1. A sleigh attachment for vehicles comprising a frame provided with longitudinal slots in the sides thereof, means for securing the front end of the frame to the body of the vehicle, a cross piece having its ends operating in said slots, attaching members upon the cross piece and adapted to connect with the body of the vehicle, and means for sliding the cross piece in said slot to advance the attaching members into rigid and locked relation with said vehicle.

2. A sleigh attachment for vehicles comprising a frame provided with longitudinal slots in the sides thereof, means for securing the front end of the frame to the body of the vehicle, a cross piece having its ends operating in said slots, attaching members upon the cross piece and adapted to connect with the body of the vehicle, means for sliding the cross piece in said slot to advance the attaching members into rigid and locked relation with said vehicle, runners on said frame, and means for moving said runners into and out of operative position relatively to said vehicle.

3. In a sleigh attachment for vehicles, a frame, attaching members on the front of the frame for attaching the front of the frame to the front of the body of the vehicle, a cross bar slidable on the frame, attaching members on the cross bar and adapted to engage the rear of the body of the vehicle, and a screw associated with said cross bar and with the frame, said screw when operated advancing said cross bar upon the frame to move said attaching members thereon into locking engagement with the body of the vehicle.

4. In a sleigh attachment for vehicles, a frame, attaching member on the front of the frame for attaching the front of the frame to the front of the body of the vehicle, a cross bar slidable on the frame, attaching members on the cross bar and adapted to engage the rear of the body of the vehicle, a screw associated with said cross bar and with the frame, said screw when operated advancing said cross bar upon the frame to move said attaching members thereon into locking engagement with the body of the vehicle, runners swingingly supported on the frame, means for moving said runners into or out of operative position with respect to the body of the vehicle, and means for locking said runners in inoperative position.

5. In a sleigh attachment for vehicles, a frame, means for attaching the same to the body of the vehicle, front and rear bearings on the sides of the frame, arms mounted to swing on said bearing, runners mounted to swing on said arms, a lever mounted to swing on the frame, a lever mounted to swing on the frame and provided with a slot, said lever and link being pivotally connected, a cross member connecting the front arms and passing through the slot in the link whereby when said lever is operated said runners will be swung upwardly or downwardly upon said frame, a cross member connecting the rear arms, and a catch on the lever adapted to engage the latter mentioned cross element to hold the runners in lowered position relatively to said frame.

6. In a sleigh attachment for vehicles, a frame, means for attaching the same to the body of the vehicle, front and rear bearings on the sides of the frame, arms mounted to swing on said bearing, runners mounted to swing on said arms, a lever mounted to swing on the frame, a lever mounted to swing on the frame and provided with a slot, said lever and link being pivotally connected, a cross member connecting the front arms and passing through the slot in the link whereby when said lever is operated said runners will be swung upwardly or downwardly upon said frame, a cross member connecting the rear arms, a catch on the lever adapted to engage the latter mentioned cross element to hold the runners in lowered position relatively to said frame, and heads on the rear arms adapted to abut against the bearings of said arms to limit the downward swinging movement of said runners.

In testimony whereof I affix my signature in presence of two witnesses.

WILLIAM GIBSON CLARK.

Witnesses:
 WILLIAM SQUANCE,
 G. W. DOUGHERTY.